(12) United States Patent
Tao et al.

(10) Patent No.: US 11,354,785 B2
(45) Date of Patent: Jun. 7, 2022

(54) IMAGE PROCESSING METHOD AND DEVICE, STORAGE MEDIUM AND ELECTRONIC DEVICE

(71) Applicant: TENCENT TECHNOLOGY (SHENZHEN) COMPANY LIMITED, Guangdong (CN)

(72) Inventors: Xin Tao, Shenzhen (CN); Hong Yun Gao, Shenzhen (CN); Xiao Yong Shen, Shenzhen (CN); Yu Wing Tai, Shenzhen (CN); Jia Ya Jia, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 122 days.

(21) Appl. No.: 16/934,823

(22) Filed: Jul. 21, 2020

(65) Prior Publication Data

US 2020/0349680 A1 Nov. 5, 2020

Related U.S. Application Data

(63) Continuation of application No. PCT/CN2019/079332, filed on Mar. 22, 2019.

(30) Foreign Application Priority Data

Apr. 4, 2018 (CN) .......................... 201810301685.1

(51) Int. Cl.
*G06K 9/00* (2022.01)
*G06T 5/00* (2006.01)
(Continued)

(52) U.S. Cl.
CPC ............ *G06T 5/003* (2013.01); *G06T 3/4046* (2013.01); *G06T 5/50* (2013.01); *G06T 2207/20081* (2013.01); *G06T 2207/20084* (2013.01)

(58) Field of Classification Search
CPC ......... G06T 5/003; G06T 3/4046; G06T 5/50; G06T 2207/20081; G06T 2207/20084
(Continued)

(56) References Cited

U.S. PATENT DOCUMENTS

2005/0047672 A1* 3/2005 Ben-Ezra ........... H04N 5/23254
382/255
2017/0365046 A1 12/2017 Tezaur et al.

FOREIGN PATENT DOCUMENTS

CN 103854268 A 6/2014
CN 106296597 A 1/2017
(Continued)

OTHER PUBLICATIONS

International Search Report for PCT/CN2019/079332 dated Jun. 25, 2019 (PCT/ISA/237).
(Continued)

*Primary Examiner* — Jonathan S Lee
(74) *Attorney, Agent, or Firm* — Sughrue Mion, PLLC

(57) ABSTRACT

An image processing method and device, storage medium and electronic device for deblurring an image. The method includes obtaining an image processing instruction including an instruction to deblur a target blurred image; obtaining a target model by training an original model based on a plurality of sample images of different scales, one of the plurality of sample images being a blurred image composed of a plurality of clear images, and the obtained target model being used for deblurring the blurred image to obtain a clear image; based on the image processing instruction, using the
(Continued)

target model to deblur the target blurred image to obtain a target clear image; and outputting the target clear image.

17 Claims, 5 Drawing Sheets

(51) Int. Cl.
  *G06T 3/40* (2006.01)
  *G06T 5/50* (2006.01)
(58) Field of Classification Search
  USPC .......................................................... 382/255
  See application file for complete search history.

(56) References Cited

FOREIGN PATENT DOCUMENTS

| | | |
|---|---|---|
| CN | 107220612 A | 9/2017 |
| CN | 107871310 A | 4/2018 |
| CN | 108629743 A | 10/2018 |

OTHER PUBLICATIONS

Sengjun Nah et al., "Deep Multi-scale Convolutional Neural Network for Dynamic Scene Deblurring", 2017 IEEE Conference on Computer Vision and Pattern Recognition, 2017, pp. 257-265, (9 pages).

Xiao-Jiao Mao et al., "Image Restoration Using Very Deep Convolutional Encoder-Decoder Networks with Symmetric Skip Connections", 29th Conference on Neural Information Processing Systems, 2016, pp. 1-9 (9 pages).

Written Opinion of the International Searching Authority dated Jun. 25, 2019 in International Application No. PCT/CN2019/079332.

Tao et al., "Scale-recurrent Network for Deep Image Deblurring", arxiv.org, Cornell University Library, 2018 Online Library Cornell University Ithaca, NY 14853, Feb. 6, 2018 (Feb. 6, 2018), XP081215285 (9 pages total).

Seungjun Nah et al., "Deep Multi-scale Convolutional Neural Network for Dynamic Scene Deblurring", arxiv.org, Cornell University Library, 2016 Online Library Cornell University Ithaca, NY 14853, Dec. 7, 2016 (Dec. 7, 2016), pp. 1-21, XP080737454 (21 pages total).

Extended European Search Report dated Oct. 7, 2021 from the European Patent Office in EP Application No. 19782211.7.

Communication dated Oct. 26, 2021 from the European Patent Office in EP Application No. 19782211.7.

\* cited by examiner

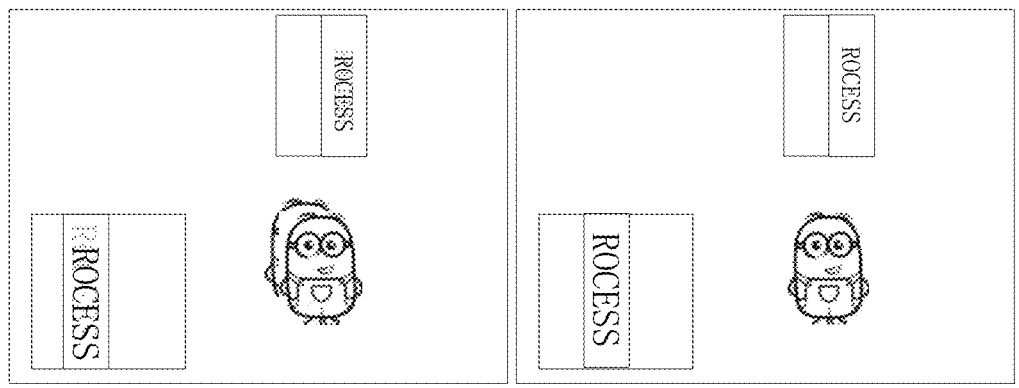
FIG. 3                    FIG. 4
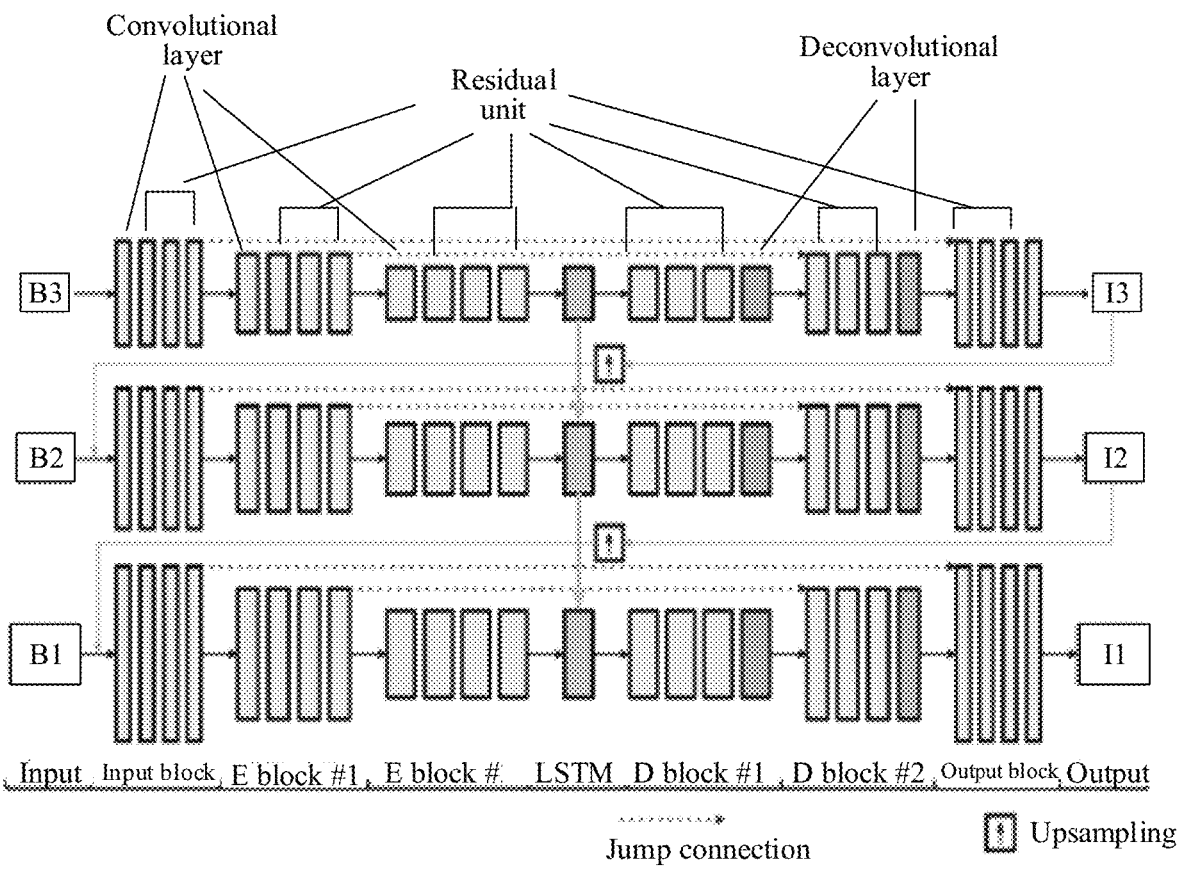
FIG. 5

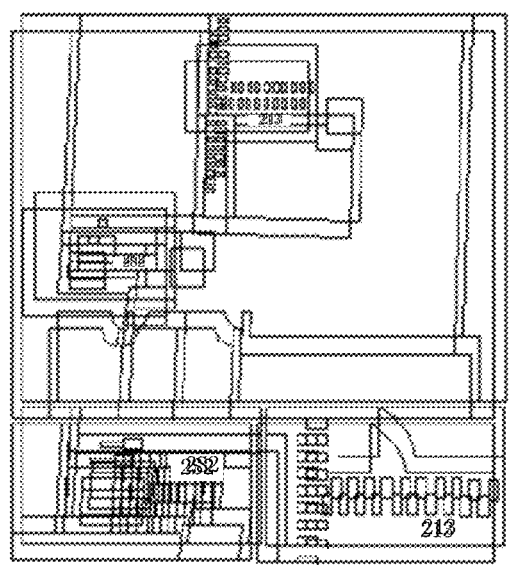 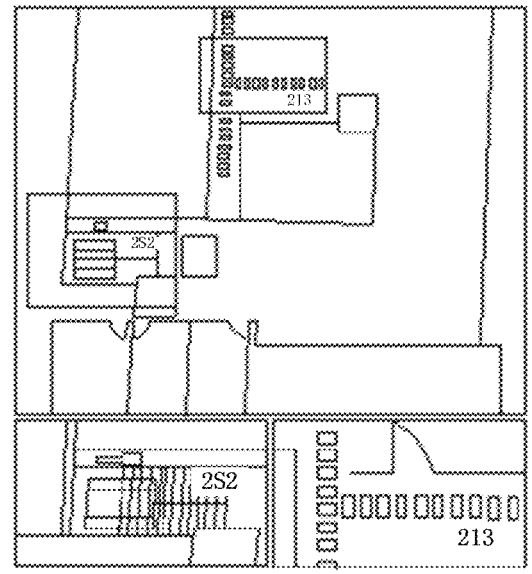
FIG. 9 FIG. 10
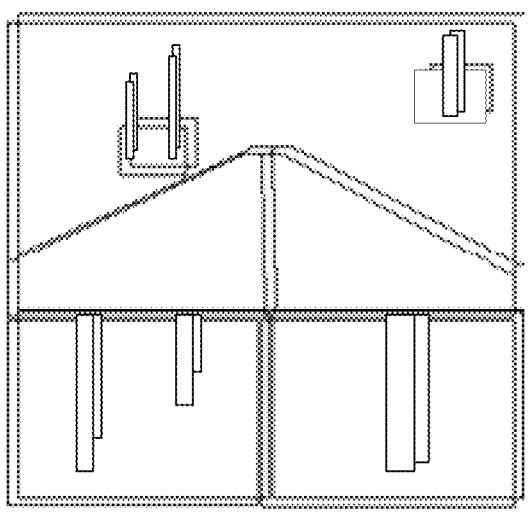 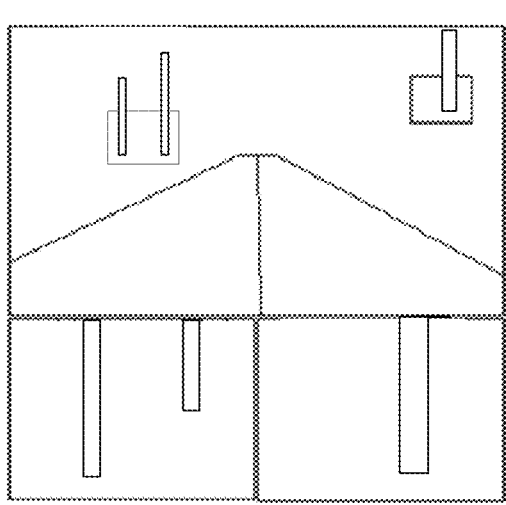
FIG. 11 FIG. 12

IMAGE PROCESSING METHOD AND DEVICE, STORAGE MEDIUM AND ELECTRONIC DEVICE

CROSS-REFERENCE TO RELATED APPLICATION(S)

This application is a continuation of PCT/CN2019/079332, and is based on and claims priority to Chinese Patent Application No. 201810301685.1, entitled "IMAGE PROCESSING METHOD AND DEVICE, STORAGE MEDIUM AND ELECTRONIC DEVICE", filed with the National Intellectual Property Administration, on Apr. 4, 2018, which are incorporated by reference herein in their entireties.

BACKGROUND

1. Field

Embodiments of the disclosure relate to the field of image processing, and in particular, to an image processing method and device, a storage medium and an electronic device.

2. Description of Related Art

Image blurring is a common problem in daily photographing, especially in a dynamic scenario or a relatively dark environment. Image deblurring is a necessary and important image processing operation to restore detail information in an image that is lost because of blurring. In a traditional single-frame image deblurring method, it is assumed that a convolution kernel model is fixed, and a deblurring effect is gradually optimized by continuously iterating convolution kernel estimation and image deconvolution. In an image deblurring method based on a neural network, an image convolution model is mostly used, and a blurred image is generated by using a blurring kernel to train the neural network.

For both the traditional iterative method and the neural network method, there is a strict convolution model hypothesis for a blurred image. A basic solution thereof is gradually optimizing a deblurring effect by continuously iterating convolution kernel estimation and image deconvolution. In different methods, specific optimization equations are provided based on different priori hypotheses of a natural image. An actual blurred image scenario is extremely complex, and includes a movement of a camera and a movement of an object in the scenario. The theoretical priori hypotheses are rarely satisfied. Consequently, the deblurring effect cannot be achieved in an actual situation in most deblurring methods, and dependability is poor.

For the foregoing problem, no effective solution has been provided.

SUMMARY

According to an embodiment, there is provided an image processing method, performed by a terminal device, the method including: obtaining an image processing instruction including an instruction to deblur a target blurred image; obtaining a target model by training an original model based on a plurality of sample images of different scales, one of the plurality of sample images being a blurred image composed of a plurality of clear images, and the obtained target model being used for deblurring the blurred image to obtain a clear image; based on the image processing instruction, using the target model to deblur the target blurred image to obtain a target clear image; and outputting the target clear image.

According to an embodiment, there is provided an image processing device, including: at least one memory configured to store computer program code; and at least one processor configured to access the memory and operate as instructed by the computer program code. The computer program code includes: first obtaining code configured to cause the at least one processor to obtain an image processing instruction, the image processing instruction including an instruction to deblur a target blurred image; second obtaining code configured to cause the at least one processor to obtain a target model by training an original model based on a plurality of sample images of different scales, one of the plurality of sample images being a blurred image composed of a plurality of clear images, and the obtained target model being used for deblurring the blurred image to obtain a clear image; response code configured to cause the at least one processor to, based on the image processing instruction, use the target model to deblur the target blurred image to obtain a target clear image; and output code configured to cause the at least one processor to output the target clear image.

According to an embodiment, there is provided a non-transitory computer-readable storage medium, storing at least one computer program instruction, the at least one computer program instruction, when executed by a processor, causes the processor to: obtain an image processing instruction including an instruction to deblur a target blurred image; obtain a target model by training an original model based on a plurality of sample images of different scales, one of the plurality of sample images being a blurred image composed of a plurality of clear images, and the obtained target model being used for deblurring the blurred image to obtain a clear image; based on the image processing instruction, use the target model to deblur the target blurred image to obtain a target clear image; and output the target clear image.

According to the embodiments, because the sample images used for training the target model are composed according to actually captured images, and may represent features of a blurred picture in an actual scenario, the target model obtained by training the original model by using the sample images can deblur a blurred image. Compared with the manner of generating a blurred image in a calculation manner such as using a convolution kernel, a difference between a priori hypothesis and an actual situation may be prevented in a procedure of generating a blurred image, thereby solving a technical problem in which a target model trained by a blurred image generated in the related art cannot implement deblurring, and achieving a technical effect of deblurring a blurred image to obtain a clear image.

BRIEF DESCRIPTION OF THE DRAWINGS

To describe embodiments of the disclosure more clearly, the following description briefly introduces the accompanying drawings, in which:

FIG. 3 is a schematic diagram of a first blurred image according to an embodiment.

FIG. 4 is a schematic diagram of a clear image obtained by deblurring the first blurred image according to an embodiment.

FIG. 5 is a schematic diagram of an original model according to an embodiment.

FIG. 9 is a schematic diagram of a third blurred image according to an embodiment.

FIG. 10 is a schematic diagram of a clear image obtained by deblurring the third blurred image according to an embodiment.

FIG. 11 is a schematic diagram of a fourth blurred image according to an embodiment.

FIG. 12 is a schematic diagram of a clear image obtained by deblurring the fourth blurred image according to an embodiment.

DESCRIPTION

To make a person skilled in the art to better understand the embodiments of the disclosure, the following description describes the embodiments with reference to the accompanying drawings. Apparently, the embodiments described herein are only some of the embodiments of the disclosure. All other embodiments obtained by a person skilled in the art based on the embodiments of the disclosure without creative efforts shall fall within the protection scope of the disclosure.

Here, the terms "first", "second", and so on may be used to distinguish between similar objects. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
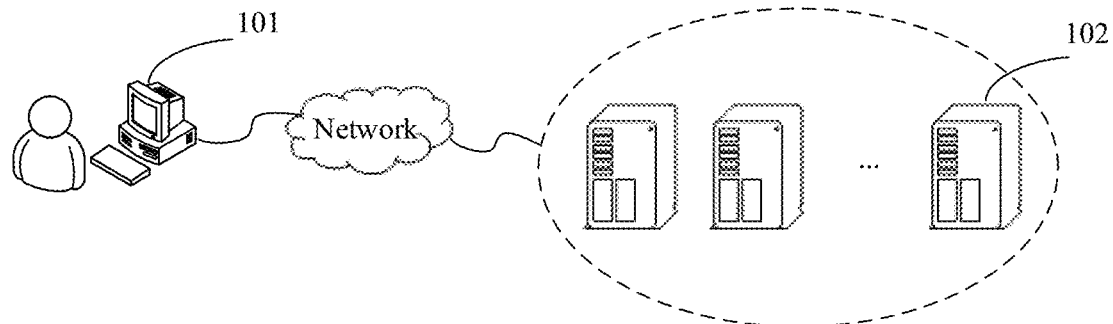
FIG. 1 is a schematic diagram of a hardware environment according to an embodiment.

According to an aspect of the embodiments, the image processing method may be applied to a hardware environment formed by a terminal 101 and a server 102 shown in FIG. 1. As shown in FIG. 1, the terminal 101 is connected to the server 102 through a network. The network includes, but is not limited to, a wide area network, a metropolitan area network, or a local area network. The terminal 101 may be a mobile phone, a PC, a notebook computer or a tablet computer, however, it is not limited thereto.

Figure 2:
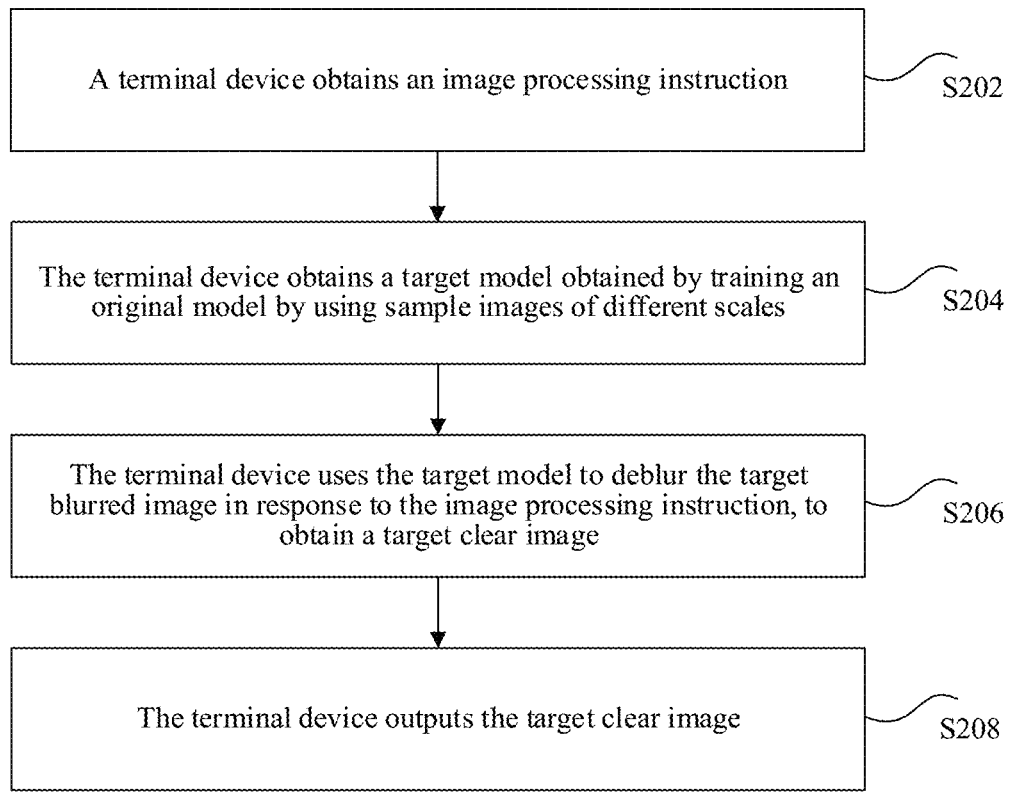
FIG. 2 is a flowchart of an image processing method according to an embodiment.

FIG. 2 is a flowchart of an image processing method according to an embodiment. Descriptions are provided by using an example in which a terminal device performs the image processing method. However, the terminal device may be the terminal 101 or the server 102 shown in FIG. 1. In addition, the terminal device may include a display configured to display images and videos. As shown in FIG. 2, the image processing method includes the following steps.

In S202, the method may include obtaining an image processing instruction, where the image processing instruction provides an instruction to deblur a target blurred image.

The deblurring is a processing in which a blurred image is transformed into a clear image. An image at a lower left corner of FIG. 3 is an enlarged image of letters on a spine of a book next to the Minion. It can be seen from the image at the lower left corner that, the image is relatively blurred, and content of the letters on the spine cannot be clearly seen.

An image at a lower left corner of FIG. 4 is an enlarged image of letters on a spine of a book next to the Minion. FIG. 4 is a clear image obtained by deblurring the image shown in FIG. 3. Particularly, comparing the lower left corner of FIG. 4 with the lower left corner of FIG. 3, the image at the lower left corner of FIG. 4 is clearer than the image at the lower left corner of FIG. 3, and can clearly display the letters "ROCESS" on the spine.

A target blurred image may be the image shown in FIG. 3, and the blurred image shown in FIG. 3 is deblurred to obtain the image shown in FIG. 4. Here, for example, a deblurring procedure is a procedure of processing the image shown in FIG. 3 to obtain the clearer image shown in FIG. 4.

In S204, the method may include obtaining a target model obtained by training an original model by using sample images of different scales. Here, the sample images may be composite images, where the composite images may be blurred images obtained by composing a plurality of clear images. The obtained target model may be used to deblur a blurred image to obtain a clear image.

In S206, the method may include using the target model to deblur the target blurred image in response to the image processing instruction to obtain a target clear image.

The target blurred image is inputted into the target model, so that the target model processes the target blurred image to obtain the target clear image. The target clear image may be the image shown in FIG. 4. The target model may be a neural network model. The target model is obtained by training the original model. The sample images required for training the original model may be blurred images composed by a plurality of clear images. That is, the sample blurred images may be generated based on clear images before being composed into the blurred images. Accordingly, the composite images may be used as the sample images, and the plurality of clear images may be used as training objects of the target model. After the trained target model is obtained, and after the composite images are inputted into the target model, a clear image corresponding to the composite images may be outputted. The clear image may be any one of the plurality of clear images. The sample images of different scales may be images obtained by performing down-sampling on the same sample image. Different down-sampling granularities lead to different scales of the obtained sample images.

In addition, before the obtaining the target model, the method may further include obtaining, by the terminal device, a plurality of continuous frames of clear images from a frame image set, the frame image set being a set of all or part of frame images in a video and combining the plurality of frames of clear images to obtain the sample images, where the sample images are blurred images.

A blurred image is usually generated by a movement of a camera during photographing or a movement of an object in a scenario. The two types of blurring are essentially caused by an excessively slow shutter speed. Within a short time in which a shutter is enabled and then disabled, because of a movement of a camera or a displacement of a scenario, an image sensor inside the camera performs pixel acquisition not only on luminance of a fixed location, but also on an integral of all luminance of related locations within the time. In images captured by a high speed camera, the integral may approximately be a sum of adjacent continuous images. This provides feasibility of simulating actual blurred images by using the high speed camera. In this embodiment, the high speed camera is used for acquiring a high speed video to compose sufficient blurred images. Because a convolutional network with relatively deep training layers needs a large amount of data, in this embodiment, a large amount of blurred images are obtained for training. For example, the blurred images may be a high speed video captured by the high speed camera at a speed of 240 frames per second. In this embodiment, the frame image set is a set of all or part of frame images in a high speed video. For example, in a 5-second high speed video, the frame image set may include 240*5=1200 frame images, and each frame image may be a clear image. A plurality of continuous frames of clear images are selected from the frame image set. The plurality of continuous frames of clear images may be images captured within hundreds of milliseconds. The images captured within hundreds of milliseconds may also include dozens to hundreds of clear images. The clear images may be composed to obtain the sample images, or some images in the clear images may be composed to obtain the sample images.

In addition, the combination of the plurality of frames of clear images to obtain the sample images may include randomly selecting some images from the plurality of frames of clear images, successively performing a summation processing and an averaging processing, respectively for each channel, on the some of the images to obtain a blurred image, and using the blurred image as the sample image.

A specific manner of randomly selecting some images from the plurality of frames of clear images is performing a summation processing and an averaging processing on several frames of images to obtain a blurred image. During the summation processing, data of each channel of the image may be respectively summed. Then the averaging processing may be respectively performed on the data of each channel. Data obtained after the averaging processing may represent a blurred image, that is, the sample image.

A plurality of blurred images may be generated based on the randomly selected some images as the sample images. For example, the some images may include 20 images. During composing of the sample images, 7 to 13 images may be randomly selected for a plurality of times for composing. Each time 7 to 13 images are selected, a blurred image may be obtained. For example, numbers of the 20 images are 1, 2, 3, . . . , 20 successively. For example, for the first time, images numbered 1 to 4 and 10 to 13 may be selected for composing, and for the second time, images numbered 3, 5, 9, 15, 16, 17, 19 and 20 may be selected for composing. Here, image selection for each time may be random.

In S208, the method may include outputting the obtained target clear image.

In this embodiment, because the sample images used for training the target model are composed according to actually captured images, and may represent features of a blurred picture in an actual scenario, the target model obtained by training the original model by using the sample images can deblur a blurred image to obtain a clear image. Compared with the manner of generating a blurred image in a calculation manner such as using a convolution kernel, a difference between a priori hypothesis and an actual situation is avoided in a procedure of generating a blurred image, thereby solving a technical problem in which a target model trained by a blurred image generated in the related art cannot implement deblurring, and achieving a technical effect of deblurring a blurred image to obtain a clear image.

Furthermore, before obtaining the target model obtained by training the original model by using sample images of different scales, the method may include repeatedly performing, by the terminal device, the following operations to train the original model until a scale of an intermediate image is the same as a scale of the composite images. According to an embodiment, a current scale may be initialized into a scale of a first image of the composite images and a current model may be initialized into the original model. The intermediate image may be initialized into the first image, where the first image is a blurred image obtained by performing down-sampling on a target sample image among the sample images.

The method may further include obtaining a first image, whose scale is the current scale, from the composite images, using the current model to deblur the intermediate image and the first image whose scale is the current scale to obtain a second image, the second image being a clearer image associated with the first image, magnifying the second image to obtain a third image, updating the current scale to a scale that is N times of the current scale, where N is greater than or equal to 2, and updating the current model to a first model, the first model being a model obtained by training the original model according to the first image.

In this embodiment, an iterative deep neural network model is used for training the target model. Images of different scales are used for training. The scale may be understood as a resolution of an image. In a procedure of training the target model that performs image deblurring, a sequence of iterating from a coarse scale to a fine scale is used. In the coarsest scale (an image which is down-sampled to the smallest and a resolution is relatively low), the image is regarded to be relatively clear. In this embodiment, using this as a start point, a clear image of the current scale is optimized, and the clear image is up-sampled as an input of a next scale to estimate a clear image of the next scale, until a scale of an outputted image is the same as the scale of the original image. A blurred image of the current scale is an image obtained by performing down-sampling on an original blurred image until the scale of the original blurred image is the current scale. Training is performed by inputting the blurred image of the current scale and the clear image of the current scale, which is obtained by optimizing the magnified clear image of the last scale, into a to-be-trained model. A clear image of the original scale is finally optimized by using this procedure as an iterative object. Therefore, deblurring is decomposed into a series of subproblems of a plurality of scales by inputting the blurred image of the current scale and a preliminary deblurred image (the preliminary deblurred image being obtained by up-sampling the clear image estimated in the last scale), to estimate the clear image of the current scale. A basic model thereof is as follows:

$$I^i, h^i = Net_{SR}(B^i, I^{i+1\uparrow}, h^{i+1\uparrow}; \theta_{SR}) \qquad (1)$$

Here, i represents the current scale (where i=1 represents a finest scale); $B^i$ represents a blurred image at the scale i; $I^i$ represents a clear image outputted at the scale i; $h^i$ represents a hidden state feature at the scale i, where convolution kernel information of all locations is implicitly estimated; $Net_{SR}$ is an iterative neural network; $\theta_{SR}$ represents weights of all convolutional layers in the iterative neural network; and "↑" represents an operation of magnifying an image by two folds. For example, an image with a resolution of 128*128 may be magnified into an image with a resolution of 256*256. According to Equation (1), a clear image I is outputted at the scale i based on the blurred image $B^i$ of the current scale and up-sampled clear image of the last scale and a hidden state as inputs of the neural network. Accordingly, clear images are continuously estimated from a coarse scale to a fine scale until a clear image reaches a scale that is the same as the scale of the sample image.

For the hidden state in the neural network, the neural network may include a recurrent neural network (RNN), a long short-term memory (LSTM) network, and a gated recurrent unit (GRU). In this embodiment, the LSTM may be used as a manner of representing hidden layer information. For the manner of magnifying a clear image estimated from a scale (i+1) (that is, upsampling the clear image of the last scale) as an input of a next scale, similarly, there are different options, including deconvolution and scaling. Considering efficiency and speed, in this embodiment, a method of bilinear interpolation scaling may be selected.

For example, the scale of the sample image is 256*256, that is, there are 256 pixels respectively in a horizontal direction and a vertical direction. The current scale is the scale of the first image, and the scale of the first image is 64*64. The first image is obtained by performing down-sampling on the sample image. The down-sampling manner may be an interval sampling, where sampling points are reduced in the sample image (for example, sampling is performed at an interval of several points or pixels). The sample image is a blurred image, and the first image obtained after down-sampling is also a blurred image. The steps may be as follows:

1. Input a first image that is used as the sample image and a first image that is used as the intermediate image into the original model for training, and output a second image obtained through preliminary deblurring, a scale of the second image being 64*64. In this case, the original model is updated to the first model after being trained, where the first image is an image of a coarse scale, the first image and the intermediate image are used as input images of the original model to output the second image that is also an image of a coarse scale, and the second image is used as an output image of the original model. A network structure of the first model and a network structure of a second model are the same, and parameters of the first model and parameters of the second model are different.

2. Magnify the second image to obtain a third image in which the scale is 128*128, where the magnification may be sampling and interpolation upsampling.

3. Perform down-sampling on the sample image to obtain a fourth image in which the scale is 128*128.

4. Input the fourth image that is used as the sample image and the third image that is used as the intermediate image into the first model for training, and output a fifth image obtained through deblurring, the fifth image being clearer than the fourth image, and a scale of the fifth image being 128*128. In this case, the first model is updated to the second model after being trained, the third image and the four image are images of a middle scale, and are used as input images of the first model to output the fifth image that is also an image of a middle scale, and the fifth image is an output image of the first model. The network structure of the second model and the network structure of the first model are the same, and the parameters of the second model and the parameters of the first model are different.

5. Magnify the fifth image to obtain a sixth image in which the scale is 256*256, and where the magnification may be sampling and interpolation upsampling.

6. Input the sample image and the sixth image into the second model for training, and output a seventh image obtained through deblurring. In this case, the second model is updated to a third model after being trained. A scale of the seventh model is the same as the scale of the sample image. The sample image is updated to a new image, and training continues to be performed by using the updated sample image until all the images in the training set are trained. A model obtained after all the images in the training set are trained is used as the target model. The sixth image and the seventh image are images of a fine scale. The sixth image and the seventh image are used as input images of the second model, to output an image that is also an image of a fine scale. The scale of the outputted image is the same as the scale of the sample image.

A multiple relationship between the scales herein is 2. However, during actual training, a different multiple relationship may be used. According to an embodiment, the scale of the sample image may be larger, such as 1024*1024. Some images are extracted from the sample images to train the original model, which may save memory space required for training the model.

In addition, the current model includes an encoding network and a decoding network. The current model deblurs the intermediate image and the first image whose scales are the current scale to obtain a second image. Here, the current model uses the encoding network to encode the first image and the intermediate image to obtain a first result, and two layers of convolutions of the encoding network further includes a residual unit, and the residual unit may be used for adding data before the two layers of convolutions are calculated; and after the two layers of convolutions are calculated, using the decoding network to decode the first result outputted by the encoding network to obtain the second image, two layers of convolutions of the decoding network including the residual unit.

Figure 6:
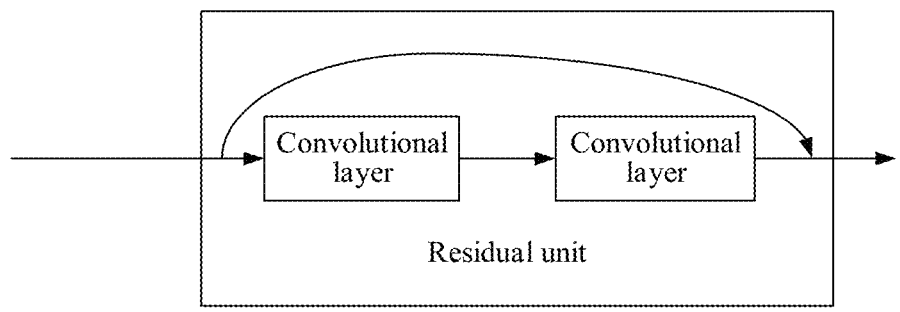
FIG. 6 is a schematic diagram of a residual unit according to an embodiment.

The current model is shown in FIG. 5. FIG. 5 shows three encoding and decoding networks in the current model. In FIG. 5, a first encoding and decoding network is from an input B1 to an output I1, a second encoding and decoding network is from an input B2 to an output I2, and a third encoding and decoding network is from an input B3 to an output I3. Each encoding and decoding network may deblur an image. Every two layers of convolutions in the encoding network and the decoding network include the residual unit. For example, for every convolution layer, there is a residual unit associated with each convolution layer. Specifically, between a first convolution layer and a second convolution layer, there is a residual unit. FIG. 6 is a schematic diagram of the residual unit according to an embodiment. In this embodiment, a non-linear convolution after a dimension reduction convolutional layer or a dimension raising convolutional layer in the encoding and decoding network is replaced with the residual unit, which ensures that quantities of residual units in each spatial dimension in the encoding network or the decoding network are the same. The residual unit may calculate a difference value between an input and an output of a block in the encoding and decoding network, so that a calculation amount becomes smaller, learning is easier, and a network learning capability is optimized. The network learning capability may be further optimized by performing jump connection on features corresponding to the encoding network and the decoding network.

The encoding and decoding networks in FIG. 5 are symmetrical networks, and include encoding networks and decoding networks. The encoding network may encode a blurred image, and output an encoded first result to the decoding network. The decoding network processes the first result to decode the first result and output a clear image. Deblurring is implemented in the encoding and decoding procedure.

As shown in FIG. 5, a structure of the encoding and decoding network of this embodiment may be decomposed into three modules, which are respectively an encoding network $Net_E$, a hidden layer unit ConvLSTM, a decoding network $Net_D$, which are successively represented by using the following Equations:

$$f^i = Net_E(B^i, I^{i+1\uparrow}; \theta_E) \quad (2)$$

$$h^i, g^i = \text{ConvLSTM}(h^{i+1\uparrow}, f^i; \theta_{LSTM}) \quad (3)$$

$$I^i = Net_D(g^i; \theta_D) \quad (4)$$

Here, $f^i$ represents an encoding feature of an $i^{th}$ scale, $B^i$ is a blurred image at the $i^{th}$ scale, $I^{i+1}$ is an enlarged image of a clear image outputted at a last scale of the $i^{th}$ scale, $h^i$ represents hidden information of the $i^{th}$ scale, $h^{i+1}$ represents hidden information of the last scale of the $i^{th}$ scale, $g^i$ represents a result obtained after optimizing f, $\theta_E$, $\theta_{LSTM}$ and $\theta_D$ respectively represent weights of all convolutional layers in the encoding network $Net_E$, weights of all convolutional layers in the hidden layer unit ConvLSTM, and weights of all convolutional layers in the decoding network $Net_D$, and "↑" represents an operation of magnifying an image by two folds. Both the encoding network and the decoding network include the residual unit to improve the network learning ability. In the same spatial dimension, three residual units may be added to balance a deblurring effect and calculation costs.

For example, the scale of the sample image is 1000*2000, that is, there are 1000 pixels in the horizontal direction and 2000 pixels in the vertical direction. The current scale is the scale of the first image, and the scale of the first image is 250*500. The first image is obtained by performing down-sampling from the sample image. The down-sampling manner may be interval sampling, and sampling points are reduced in the sample image (for example, sampling is performed at an interval of several points). The sample image is a blurred image, and the first image obtained after down-sampling is also a blurred image. The steps are as follows:

1. Input a first image that is used as the sample image and a first image that is used as the intermediate image into the original model as an input $B_3$ for training, and output a second image $I_3$ obtained through preliminary deblurring, a scale of the second image being 250*500. In this case, the original model is updated to the first model after being trained.

2. Magnify the second image to obtain a third image in which the scale is 500*1000. The magnification may be performed by sampling and interpolation upsampling.

3. Perform down-sampling on the sample image to obtain a fourth image in which the scale is 500*1000.

4. Input the fourth image that is used as the sample image and the third image that is used as the intermediate image into the original model as an input $B_2$ for training, and output a fifth image $I_2$ obtained through deblurring, a scale of the fifth image being 500*1000. In this case, the first model is updated to the second model after being trained.

5. Magnify the fifth image to obtain a sixth image in which the scale is 1000*2000. The magnification may be performed by sampling and interpolation upsampling.

6. Input the sample image and the sixth image into the second model as an input $B_1$ for training, and output a seventh image $I_1$ obtained through deblurring. In this case, the second model is updated to a third model after being trained. A scale of the seventh model is the same as the scale of the sample image, and training is finished.

Figures 7, 8:
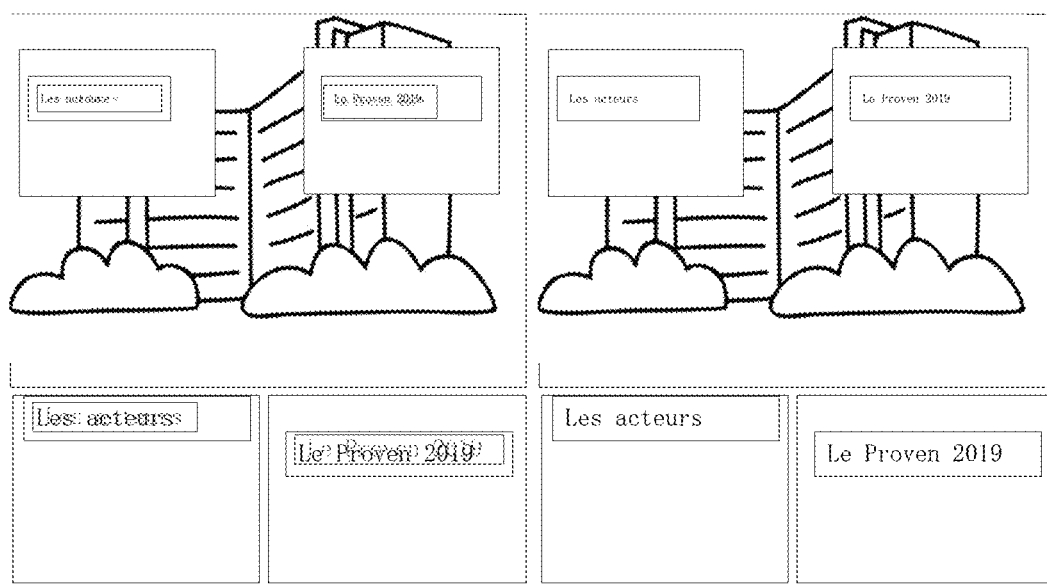
FIG. 7 is a schematic diagram of a second blurred image according to an embodiment.
FIG. 8 is a schematic diagram of a clear image obtained by deblurring the second blurred image according to an embodiment.

With reference to FIG. 7 and FIG. 8, an image in FIG. 7 may be the sample image inputted into the original model, and an image shown in FIG. 8 may be the seventh image as described above.

With reference to FIG. 9 and FIG. 10, an image in FIG. 9 may be the sample image inputted into the original model, and an image shown in FIG. 10 may be the seventh image.

With reference to FIG. 11 and FIG. 12, an image in FIG. 11 may be the sample image inputted into the original model, and an image shown in FIG. 12 may be the seventh image.

According to an embodiment, the original model is trained by using an iterative deep neural network model to obtain the target model. In the training procedure, the clear image obtained in the last scale is magnified as an input of the current scale, and training is performed with reference to the blurred image of the current scale to obtain the target model. The blurred image is deblurring by using the target model to obtain a clear image.

In addition, the using of the current model to deblur the intermediate image or the first image whose scale is the current scale to obtain a second image may include obtaining inherent information of images of different scales, the inherent information being transmitted through a recursive neural network (RNN) in the current model, between encoding and decoding networks processing different scales; and using the encoding and decoding networks to deblur the intermediate image and the first image whose scale is the current scale in combination with the inherent information to obtain the second image.

In this embodiment, hidden information related to blurring needs to be transmitted between different scales. A module correspondingly processing iterative information needs to be added inside the encoding and decoding network. As shown in FIG. 5, an LSTM module (LSTM network) is added to a middle location between the encoding network and the decoding network, so that the module may transmit the hidden information between different scales. The hidden information may be common information between images of different scales, for example, information such as structures of the images of different scales.

The foregoing embodiments are expressed as a series of combinations for the purpose of description, but a person skilled in the art may reasonably understand that some steps may be performed simultaneously or in different sequences according to the embodiments.

According to the foregoing implementations, a person skilled in the art may clearly learn that the method according to the foregoing embodiment may be implemented by software and a commodity hardware platform or by using hardware. Based on such an understanding, the technical solutions in the embodiments essentially or partly solves the problem in the related art, and may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the method described in the embodiments.

Figure 13:
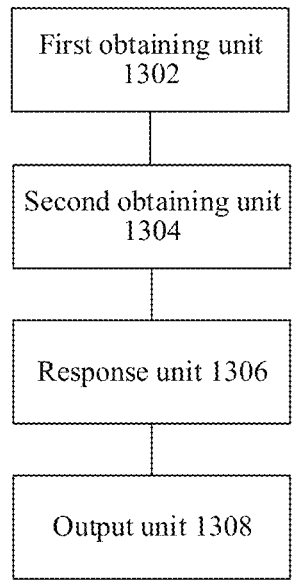
FIG. 13 is a schematic diagram of an image processing device according to an embodiment.

FIG. 13 is a schematic diagram of an image processing device according to an embodiment. As shown in FIG. 13, the device includes one or more processors and one or more memories storing program, the program being executed by the processor, and the program may include a first obtaining unit 1302, a second obtaining unit 1304, a response unit 1306, and an output unit 1308.

The first obtaining unit 1302 is configured to obtain an image processing instruction, the image processing instruction being used for instructing to deblur a target blurred image.

The deblurring is a process of transforming a blurred image into a clear image. An image at a lower left corner of FIG. 3 is an enlarged image of letters on a spine of a book behind the Minion in the drawing. It can be seen from the image at the lower left corner that, the image is relatively blurred, and content of the letters on the spine cannot be clearly seen.

An image at a lower left corner of FIG. 4 is an enlarged image of letters on a spine of a book behind the Minion in the drawing. FIG. 4 is a clear image obtained by deblurring FIG. 3. Particularly, comparing the lower left corner of FIG. 4 with the lower left corner of FIG. 3, the image at the lower left corner of FIG. 4 is clearer than the image at the lower left corner of FIG. 3, and can clearly display the letters "ROCESS" on the spine.

The target blurred image may be the image shown in FIG. 3, and the blurred image shown in FIG. 3 is deblurred to obtain the image shown in FIG. 4. A deblurring procedure is a procedure of processing the image shown in FIG. 3 to obtain the image shown in FIG. 4.

The second obtaining unit 1304 is configured to obtain a target model obtained by training an original model by using sample images of different scales, the sample images being composite images, the composite images being blurred images obtained by composing a plurality of clear images. The target model is used for deblurring a blurred image to obtain a clear image.

The response unit 1306 is configured to use the target model to deblur the target blurred image in response to the image processing instruction to obtain a target clear image.

The target blurred image is inputted into the target model so that the target model processes the target blurred image to obtain the target clear image. The target clear image may be, for example, the image shown in FIG. 4. The target model may be a neural network model. The target model is obtained by training the original model. The sample images used for training the original model are blurred images composed by a plurality of clear images. Clear images corresponding to the generated blurred images are the clear images before being composed into the blurred images. That is, the composite images may be used as the sample images, and the plurality of clear images are training objects of the target model. After the trained target model is obtained, and after the composite images are inputted into the target model, a clear image corresponding to the composite images may be outputted. The clear image may be any one of the plurality of clear images.

The device may further include a third obtaining unit configured to, before the original model being trained by using the sample images of different scales to obtain the target model, obtain a plurality of continuous frames of clear images from a frame image set, the frame image set being a set of all or part of frame images in a video. The device may also include a combination unit configured to combine the plurality of frames of clear images to obtain the sample images, where the sample images are blurred images.

Generation of blurred data in an image is usually caused by a movement of a camera during photographing or a movement of an object in a scenario. The two types of blurring are essentially caused by an excessively slow shutter speed. Within a short time in which a shutter is enabled and then disabled, because of a movement of a camera or a displacement of a scenario, an image sensor inside the camera performs pixel acquisition not only on luminance of a fixed location, but also on an integral of all luminance of related locations within the time. In images captured by a high speed camera, the integral may approximately be a sum of adjacent continuous images. This provides feasibility of simulating actual blurred images by using the high speed camera. In this embodiment, the high speed camera is used for acquiring a high speed video, to compose sufficient blurred images. Because a convolutional network with relatively deep training layers needs a large amount of data, in this embodiment, a large amount of blurred images may be obtained for training. The blurred images may be a high speed video captured by the high speed camera at a speed of 240 frames per second. In this embodiment, the frame image set is a set of all frame images in a high speed video. For example, in a 5-second high speed video, the frame image set includes 240*5=1200 frame images, and each frame image is a clear image. A plurality of continuous frames of clear images are selected from the frame image set. The plurality of continuous frames of clear images may be images captured within hundreds of milliseconds. The images captured within hundreds of milliseconds may also include dozens to hundreds of clear images. The clear images may be composed to obtain the sample images, or some images in the clear images may be composed to obtain the sample images.

Furthermore, the combination unit may include a selection module configured to randomly select some images from the plurality of frames of clear images, a second processing module configured to successively perform summation processing and averaging processing, respectively for each channel, on the some images to obtain a blurred image, and a determining module configured to use the blurred image as the sample image.

A specific manner of randomly selecting some images from the plurality of frames of clear images is performing a summation processing and an averaging processing on several frames of images to obtain a blurred image. During the summation processing, data of each channel of the image may be respectively summed. Then the averaging processing is respectively performed on the data of each channel. Data obtained after the averaging processing may represent a generated blurred image, that is, the sample image.

A plurality of blurred images may be generated based on the randomly selected some images as the sample images. For example, the some images may include 20 images. During composing of the sample images, 7 to 13 images may be randomly selected for a plurality of times for composing. Each time 7 to 13 images are selected, a blurred image may be obtained. For example, numbers of the 20 images are 1, 2, 3, ..., 20 successively. For the first time, images numbered 1 to 4 and 10 to 13 are selected for composing, and for the second time, images numbered 3, 5, 9, 15, 16, 17, 19 and 20 may be selected for composing. Here, images selected for each time may be random.

The device may include an output unit 1308 configured to output the target clear image.

In this embodiment, because the sample images used for training the target model are composed according to actually captured images, and may represent features of a blurred picture in an actual scenario, the target model obtained by training the original model based on the sample images can deblur a blurred image to obtain a clear image. Compared with the manner of generating a blurred image in a calculation manner such as using a convolution kernel, a difference between a priori hypothesis and an actual situation is avoided in a procedure of generating a blurred image, thereby avoiding a technical problem that a target model trained by a blurred image generated in the related art cannot implement deblurring, and achieving a technical effect of deblurring a blurred image to obtain a clear image.

Furthermore, the device may include a training unit configured to repeatedly invoke, before obtaining the target model by training the original model using the sample images of different scales, the following modules to train the original model until a scale of an intermediate image is the same as a scale of the composite images. A current scale being initialized into a scale of a first image of the composite images, a current model being initialized into the original model, the intermediate image being initialized into the first image, and the first image being a blurred image obtained by performing down-sampling on a target image in the sample images.

The device may include a first obtaining module configured to obtain a first image, in which a scale is the current scale, from the composite images, a first processing module configured to use the current model to deblur the intermediate image and the first image whose scale is the current scale to obtain a second image, where the second image is a clear image associated with the first image, a magnification module configured to magnify the second image to obtain a third image, where the intermediate image is updated to the third image, a first update module configured to update the current scale to a scale that is N times of the current scale, where N is greater than or equal to 2, and a second update module configured to update the current model to a first model, the first model being a model obtained by training the original model according to the first image.

In this embodiment, an iterative deep neural network model is used for training the target model. Images of different scales are used for training. The scale may be understood as a resolution of an image. In a procedure of training the target model that performs image deblurring, a sequence of iterating from a coarse scale to a fine scale is used. In a coarsest scale (an image is down-sampled to the smallest and a resolution is relatively low), the image is regarded to be relatively clear. In this embodiment, using this as a start point, a clear image of the current scale may be optimized, and the clear image may be up-sampled as an input of a next scale to estimate a clear image of the next scale until a scale of an outputted image is the same as the scale of the original image. A blurred image of the current scale is an image obtained by performing down-sampling on an original blurred image until the scale of the original blurred image is the current scale. Training is performed by inputting the blurred image of the current scale and the clear image of the current scale, which is obtained by optimizing the magnified clear image of the last scale into a to-be-trained model. A clear image of the original scale is finally optimized by using this procedure as an iterative object. Therefore, deblurring is decomposed into a series of sub-problems of a plurality of scales by inputting the blurred image of the current scale and a preliminary deblurred image (the preliminary deblurred image obtained by up-sampling the clear image estimated in the last scale) to estimate the clear image of the current scale. A basic model thereof is show in the Equation 1 provided above, which is as follows:

$$I^i, h^i = Net_{SR}(B^i, I^{i+1\uparrow}, h^{i+1\uparrow}; \theta_{SR})$$

Here, i represents the current scale (where 1 represents a finest scale); $B^i$ represents a blurred image at the scale i; $I^i$ represents a clear image outputted at the scale i; $h^i$ represents a hidden state feature at the scale i, where convolution kernel information of all locations is implicitly estimated; $Net_{SR}$ is an iterative neural network; $\theta_{SR}$ represents weights of all convolutional layers in the iterative neural network; and "↑" represents an operation of magnifying an image by two folds. The meaning of this formula is to, for the scale i, provide the blurred image $B^i$ of the current scale, upsample the clear image of the last scale and a hidden state as inputs of the neural network, and output the clear image of the current scale and the hidden state. Based on this, clear images are continuously estimated from a coarse scale to a fine scale until a clear image whose scale is the same as the scale of the sample image.

For the hidden state in the neural network, there are different selections, including an RNN, an LSTM network, and a GRU. In this embodiment, the LSTM may be used as a manner of representing hidden layer information. For the manner of magnifying a clear image estimated from a scale (i+1) (that is, upsampling the clear image of the last scale) as an input of a next scale, similarly, there are different options, including deconvolution and scaling. Considering efficiency and speed, in this embodiment, a method of bilinear interpolation scaling may be selected.

For example, the scale of the sample image is 256*256, that is, there are 256 pixels respectively in a horizontal direction and a vertical direction. The current scale is the scale of the first image, and the scale of the first image is 64*64. The first image is obtained by performing down-sampling on the sample image. The down-sampling manner may be interval sampling, and sampling points are reduced in the sample image (for example, sampling is performed at an interval of several points). The sample image is a blurred image, and the first image obtained after down-sampling is also a blurred image. The steps are as follows:

1. Input a first image that is used as the sample image and a first image that is used as the intermediate image into the original model for training, and output a second image obtained through preliminary deblurring, a scale of the second image being 64*64. In this case, the original model is updated to the first model after being trained; the first image is an image of a coarse scale, the first image and the intermediate image are used as input images of the original model, to output the second image that is also an image of a coarse scale, and the second image is used as an output image of the original model. A network structure of the first model and a network structure of a second model are the same, and parameters of the first model and parameters of the second model are different.

2. Magnify the second image, to obtain a third image whose scale is 128*128. The magnification may be performed by sampling and interpolation upsampling.

3. Perform down-sampling on the sample image to obtain a fourth image whose scale is 128*128.

4. Input the fourth image that is used as the sample image and the third image that is used as the intermediate image into the first model for training, and output a fifth image obtained through deblurring, the fifth image being clearer than the fourth image, and a scale of the fifth image being 128*128. In this case, the first model is updated to the second model after being trained, the third image and the four image are images of a middle scale, and are used as input images of the first model to output the fifth image that is also an image of a middle scale, and the fifth image is an output image of the first model. The network structure of the second model and the network structure of the first model are the same, and the parameters of the second model and the parameters of the first model are different.

5. Magnify the fifth image to obtain a sixth image whose scale is 256*256. The magnification may be performed by sampling and interpolation upsampling.

6. Input the sample image and the sixth image into the second model for training, and output a seventh image obtained through deblurring. In this case, the second model is updated to a third model after being trained. A scale of the seventh model is the same as the scale of the sample image. The sample image is updated to a new image, and training continues to be performed by using the updated sample image until all the images in the training set are trained. A model obtained after all the images in the training set are trained is used as the target model. The sixth image and the seventh image are images of a fine scale. The sixth image and the seventh image are used as input images of the second model to output an image that is also an image of a fine scale. The scale of the outputted image is the same as the scale of the sample image.

A multiple relationship between the scales herein is 2. During actual training, a different multiple relationship may be used. In this embodiment, the scale of the sample image may be larger, such as 1024*1024. Some images are extracted from the sample images to train the original model, which may save memory space required for training the model.

In addition, the current model includes an encoding network and a decoding network. The first processing module includes an encoding submodule configured to use the encoding network to encode the first image and the intermediate image to obtain a first result, two layers of convolutions of the encoding network further including a residual unit, and the residual unit being configured to add data before the two layers of convolutions are calculated and to add data after the two layers of convolutions are calculated; and a decoding submodule configured to use the decoding network to decode the first result outputted by the encoding network to obtain the second image, two layers of convolutions of the decoding network including the residual unit.

The current model is shown in FIG. 5. FIG. 5 shows three encoding and decoding networks in the current model. In FIG. 5, a first encoding and decoding network is from an input B1 to an output I1, a second encoding and decoding network is from an input B2 to an output I2, and a third encoding and decoding network is from an input B3 to an output I3. Each encoding and decoding network may deblur an image. Every two layers of convolutions in the encoding network and the decoding network includes the residual unit. FIG. 6 is a schematic diagram of the residual unit according to an embodiment. In this embodiment, a nonlinear convolution after a dimension reduction convolutional layer or a dimension raising convolutional layer in the encoding and decoding network is replaced with the residual unit, which ensures that quantities of residual units in each spatial dimension in the encoding network or the decoding network are the same. The residual unit may calculate a difference value between an input and an output of a block in the encoding and decoding network, so that a calculation amount becomes smaller, learning is easier, and a network learning capability is optimized. The network learning capability may be further optimized by performing jump connection on features corresponding to the encoding network and the decoding network.

The encoding and decoding networks in FIG. 5 are symmetrical networks, and include encoding networks and decoding networks. The encoding network may encode a blurred image, and output an encoded first result to the decoding network. The decoding network processes the first result to output a clear image. Deblurring is implemented in the encoding and decoding procedure.

As shown in FIG. 5, a structure of the encoding and decoding network of this embodiment may be decomposed into three modules, which are respectively an encoding network $Net_E$ (including an input block, an E block #1, and an E block #2 in FIG. 5), a hidden layer unit ConvLSTM (an LTSM shown in FIG. 5), a decoding network $Net_D$ (including an output block, a D block #1, and a D block #2 in FIG. 5), which are successively represented by using the following equations:

$$f^i = Net_E(B^i, I^{i+1\uparrow}; \theta_E)$$

$$h^i, g^i = ConvLSTM(h^{i+1\uparrow}, f^i; \theta_{LSTM})$$

$$I^i = Net_D(g^i; \theta_D)$$

These equations are the same as those provided above with respect to Equations (2) to (4). Here, $f^i$ represents an encoding feature of an $i^{th}$ scale, $B^i$ is a blurred image at the $i^{th}$ scale, $I^{i+1}$ is an enlarged image of a clear image outputted at a last scale of the $i^{th}$ scale, $h^i$ represents hidden information of the $i^{th}$ scale, $h^{i+1}$ represents hidden information of the last scale of the $i^{th}$ scale, $g^i$ represents a result obtained after optimizing f, $\theta_E$, $\theta_{LSTM}$, and $\theta_D$ respectively represent weights of all convolutional layers in the encoding network NetE, weights of all convolutional layers in the hidden layer unit ConvLSTM, and weights of all convolutional layers in the decoding network NetD, and "↑" represents an operation of magnifying an image by two folds. Both the encoding network and the decoding network include the residual unit to improve the network learning ability. In the same spatial dimension, three residual units may be added to balance a deblurring effect and calculation costs.

For example, the scale of the sample image may be 1000*2000, that is, there are 1000 pixels in the horizontal direction and 2000 pixels in the vertical direction. The current scale is the scale of the first image, and the scale of the first image is 250*500. The first image is obtained by performing down-sampling from the sample image. The down-sampling manner may be interval sampling, and sampling points are reduced in the sample image (for example, sampling is performed at an interval of several points). The sample image is a blurred image, and the first image obtained after down-sampling is also a blurred image. The steps are as follows:

1. Input a first image that is used as the sample image and a first image that is used as the intermediate image into the original model as an input $B_3$ for training, and output a second image $I_3$ obtained through preliminary deblurring, a scale of the second image being 250*500. In this case, the original model is updated, to the first model after being trained.

2. Magnify the second image to obtain a third image whose scale is 500*1000. The magnification may be performed by sampling and interpolation upsampling.

3. Perform down-sampling on the sample image to obtain a fourth image whose scale is 500*1000.

4. Input the fourth image that is used as the sample image and the third image that is used as the intermediate image into the original model as an input $B_2$ for training, and output a fifth image $I_2$ obtained through deblurring, a scale of the fifth image being 500*1000. In this case, the first model is updated to the second model after being trained.

5. Magnify the fifth image to obtain a sixth image whose scale is 1000*2000. The magnification may be performed by sampling and interpolation upsampling.

6. Input the sample image and the sixth image into the second model as an input $B_1$ for training, and output a seventh image $I_1$ obtained through deblurring. In this case, the second model is updated to a third model after being trained. A scale of the seventh model is the same as the scale of the sample image, and training is finished.

With reference to FIG. 7 and FIG. 8, an image in FIG. 7 may be used as the sample image inputted into the original model, and an image shown in FIG. 8 may be used as the seventh image.

With reference to FIG. 9 and FIG. 10, an image in FIG. 9 may be used as the sample image inputted into the original model, and an image shown in FIG. 10 may be used as the seventh image.

With reference to FIG. 11 and FIG. 12, an image in FIG. 11 may be used as the sample image inputted into the original model, and an image shown in FIG. 12 may be used as the seventh image.

In this embodiment, the original model is trained by using an iterative deep neural network model to obtain the target model. In a training procedure, the clear image obtained in the last scale is magnified as an input of the current scale, and training is performed with reference to the blurred image of the current scale, to obtain the target model. The blurred image is deblurring by using the target model to obtain a clear image.

Furthermore, the first processing module may include an obtaining submodule configured to obtain inherent information of images of different scales, the inherent information being transmitted through an RNN in the current model, between encoding and decoding networks processing different scales, and a processing submodule configured to use the encoding and decoding networks to deblur the intermediate image and the first image whose scale is the current scale in combination with the inherent information, to obtain the second image.

In this embodiment, hidden information related to blurring needs to be transmitted between different scales. A module correspondingly processing iterative information needs to be added inside the encoding and decoding network. As shown in FIG. 5, an LSTM module (or LSTM network) is added to a middle location between the encoding network and the decoding network, so that the module may transmit the hidden information between different scales. The hidden information may be common information between images of different scales, for example, information such as structures of the images of different scales.

Figure 14:
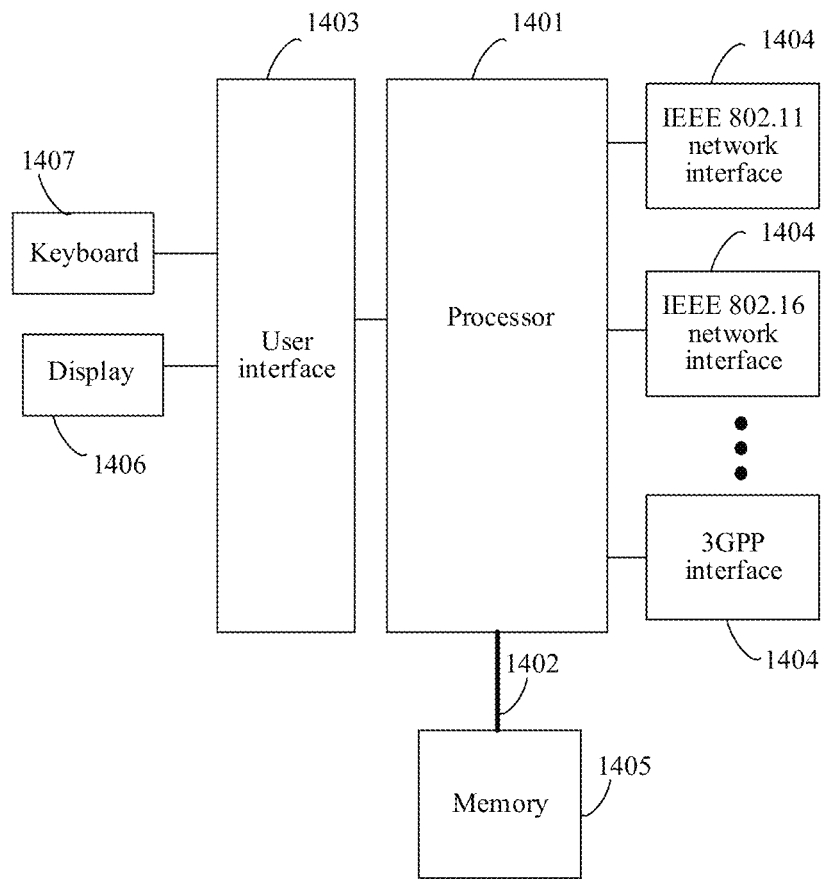
FIG. 14 is a schematic diagram of an electronic device according to an embodiment.

According to an embodiment, an electronic device configured to implement the foregoing image processing method is further provided. The electronic device may be the terminal 101 or the server 102 shown in FIG. 1. As shown in FIG. 14, the electronic device includes a memory and a processor, the memory storing a computer program, and the processor being configured to perform the steps according to any one of the foregoing method embodiments by using the computer program.

FIG. 14 is a structural block diagram of an electronic device according to an embodiment. As shown in FIG. 14, the electronic device may include one or more processors 1401, at least one communications bus 1402, a user interface 1403, at least one transmission device 1404, and at least one memory 1405. The communications bus 1402 is configured to implement connection and communication between the components. The user interface 1403 may include a display 1406 and a keyboard 1407. In addition, the transmission device 1404 may include a standard wired interface and wireless interface.

The electronic device may be located in at least one of a plurality of network devices in a computer network.

In this embodiment, the processor may be configured to perform the following steps by using a computer program.

In step S1, the processor may be configured to obtain an image processing instruction, the image processing instruction being used for instructing to deblur a target blurred image.

In step S2, the processor may be configured to obtain a target model obtained by training an original model by using sample images of different scales, the sample images being composite images, the composite images being blurred images obtained by composing a plurality of clear images, and the target model being used for deblurring a blurred image to obtain a clear image.

In step S3, the processor may be configured to use the target model to deblur the target blurred image in response to the image processing instruction to obtain a target clear image.

In step S4, the processor may be configured to output the target clear image.

In addition, a person of ordinary skill in the art may understand that, the structure shown in FIG. 14 is only illustrative. The electronic device may be a terminal device such as a smartphone (for example, an Android mobile phone or an iOS mobile phone), a tablet computer, a palmtop computer, a mobile Internet device (MID), or a portable android device (PAD). FIG. 14 does not constitute a limitation on a structure of the foregoing electronic device. For example, the electronic device may further include more or fewer components (such as a network interface and a display device) than those shown in FIG. 14, or have a configuration different from that shown in FIG. 14.

The memory 1405 may be configured to store a software program and a module, for example, a program instruction/module corresponding to the image processing method and device in the embodiments. The processor 1401 performs various functional applications and data processing by running the software program and the module stored in the memory 1405, that is, implementing the foregoing image processing method. The memory 1405 may include a high-speed random memory, and a non-volatile memory such as one or more magnetic storage devices, a flash, or another non-volatile solid-state memory. In some examples, the memory 1405 may further include memories remotely disposed relative to the processor 1401, and these remote memories may be connected to a terminal through a network. Examples of the network include, but are not limited to, the Internet, an intranet, a local area network, a mobile communications network, and a combination thereof.

The transmission device 1404 is configured to receive or send data through a network. Specific examples of the foregoing network may include a wired network and a wireless network. In an example, the transmission device 1404 includes a network interface controller (NIC). The NIC may be connected to another network device and a router by using a network cable, so as to communicate with the Internet or the local area network. In an example, the transmission device 1404 is a radio frequency (RF) module, and is configured to wirelessly communicate with the Internet.

Specifically, the memory 1405 may be configured to store sample images.

According to an embodiment, a storage medium is further provided. The storage medium may be a non-transient computer-readable storage medium. The storage medium stores a computer program, and the computer program may be configured to perform the steps according to any one of the foregoing method embodiments when being run.

The storage medium may be configured to store a computer program used for performing the following steps:

S1: Obtain an image processing instruction, the image processing instruction being used for instructing to deblur a target blurred image;

S2: Obtain a target model obtained by training an original model by using sample images of different scales, the sample images being composite images, the composite images being blurred images obtained by composing a plurality of clear images, and the target model being used for deblurring a blurred image to obtain a clear image;

S3: Use the target model to deblur the target blurred image in response to the image processing instruction, to obtain a target clear image; and S4: Output the target clear image.

In addition, the storage medium may be configured to store a computer program used for performing the following steps: repeatedly performing the image processing operations to train the original model until a scale of an intermediate image is the same as a scale of the composite images, a current scale being initialized into a scale of a first image of the composite images, a current model being initialized into the original model, the intermediate image being initialized into the first image, and the first image being a blurred image obtained by performing down-sampling on a target image in the sample images: obtaining a first image, whose scale is the current scale, from the composite images; using the current model to deblur the intermediate image and the first image whose scale is the current scale to obtain a second image, the second image being a clear image associated with the first image; magnifying the second image to obtain a third image, the intermediate image being updated to the third image; updating the current scale to a scale that is N times of the current scale, N being greater than or equal to 2; and updating the current model to a first model, the first model being a model obtained by training the original model according to the first image.

Furthermore, the storage medium is configured to store a computer program used for performing the following steps: obtaining a plurality of continuous frames of clear images from a frame image set, the frame image set being a set of all or some of frame images in a video; and combining the plurality of frames of clear images to obtain the sample images, the sample images being blurred images.

In addition, the storage medium is configured to store a computer program used for performing the following steps: randomly selecting some images from the plurality of frames of clear images; successively performing a summation processing and an averaging processing, respectively for each channel, on the some images, to obtain a blurred image; and using the blurred image as the sample image.

The storage medium is configured to store a computer program used for performing the following steps: using the encoding network to encode the first image and the intermediate image to obtain a first result, two layers of convolutions of the encoding network further including a residual unit, and the residual unit being used for adding data before the two layers of convolutions are calculated and to add data after the two layers of convolutions are calculated; and using the decoding network to decode the first result outputted by the encoding network to obtain the second image, two layers of convolutions of the decoding network including the residual unit.

The storage medium is configured to store a computer program used for performing the following steps: obtaining inherent information of images of different scales, the inherent information being transmitted through an RNN in the current model, between encoding and decoding networks processing different scales; and using the encoding and decoding networks to deblur the intermediate image and the first image whose scale is the current scale in combination with the inherent information, to obtain the second image.

The storage medium is further configured to store a computer program used for performing the steps included in the method in the foregoing embodiments, which are not described again in this embodiment.

A person of ordinary skill in the art may understand that all or part of the steps in the foregoing embodiments may be implemented by a program by instructing hardware relevant to a terminal device. The program may be stored in a computer-readable storage medium, and the storage medium may include: a flash drive, a read-only memory (ROM), a random access memory (RAM), a magnetic disk, an optical disc, and the like.

In a case that the integrated unit in the foregoing embodiments is implemented in the form of a software function unit and sold or used as an independent product, the integrated unit may be stored in the foregoing computer-readable storage medium. Based on such understanding, the technical solutions in the embodiments essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments.

In the foregoing embodiments, descriptions of the embodiments have different emphases, and as for parts that are not described in detail in one embodiment, reference can be made to the relevant descriptions of the other embodiments.

In the some embodiments, it is to be understood that the disclosed client may be implemented in other manners. For example, the described device embodiment is merely an example. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments may be integrated into one processing unit, or each of the units may exist alone physically, or two or more units are integrated into one unit. The integrated unit may be implemented in the form of hardware, or may be implemented in the form of a software functional unit.

The above descriptions are merely example embodiments of the disclosure, and a person of ordinary skill in the art may make various improvements and modifications without departing from the spirit of the embodiments of the disclosure. All such improvements and modifications are also intended to be covered by the embodiments of this disclosure.

What is claimed is:

1. An image processing method, performed by a terminal device, the method comprising:
obtaining an image processing instruction including an instruction to deblur a target blurred image;
obtaining a target model by training an original model based on a plurality of sample images of different scales, one of the plurality of sample images being a blurred image composed of a plurality of clear images, and the obtained target model being used for deblurring the blurred image to obtain a clear image;
based on the image processing instruction, using the target model to deblur the target blurred image to obtain a target clear image; and
outputting the target clear image,
wherein, before the obtaining the target model by training the original model, the method further comprises:
obtaining a plurality of continuous frames of clear images from a frame image set, the frame image set being a set of all or some of frame images in a video; and
combining the plurality of frames of clear images to obtain the plurality of sample images, the plurality of sample images being blurred images,
wherein the combining the plurality of frames of clear images to obtain the plurality of sample images comprises:
successively performing a summation processing and an averaging processing, respectively for each channel processing the some clear images to obtain the blurred image; and
using the blurred image as the one of the plurality of sample images.

2. The method according to claim 1, wherein, before the obtaining the target model by training the original model, the method comprises:
repeatedly training the original model until a scale of an intermediate image is the same as a scale of the one of the plurality of sample images, a current scale of the intermediate image being initialized as a scale of a first image of the plurality of sample images, a current model being initialized as the original model, the intermediate image being initialized as the first image, and the first image being the blurred image obtained by performing down-sampling on a target sample image among the plurality of sample images;
obtaining the first image having the current scale, from the plurality of sample images;
using the current model to deblur the intermediate image and the first image having the current scale to obtain a second image, the second image being a first clear image associated with the first image;
magnifying the second image to obtain a third image, the intermediate image being updated to the third image;
updating the current scale to a scale that is N times of the current scale, the N being greater than or equal to 2; and
updating the current model to a first model, the first model being obtained by training the original model according to the first image.

3. The method according to claim 2, wherein the current model comprises an encoding network and a decoding network, and
wherein the using the current model to deblur the intermediate image and the first image having the current scale to obtain the second image comprises:
using the encoding network to encode the first image and the intermediate image to obtain a first result, two layers of convolutions of the encoding network comprising a residual unit, and the residual unit being used for adding data before the two layers of convolutions are calculated and to add data after the two layers of convolutions are calculated; and
using the decoding network to decode the first result outputted by the encoding network to obtain the second image, two layers of convolutions of the decoding network comprising the residual unit.

4. The method according to claim 3, wherein the two layers of convolutions of the encoding network and the two layers of convolutions of the decoding network each comprise a first convolution layer and a second convolution layer, and
wherein the residual unit is configured between the first convolution layer and the second convolution layer.

5. The method according to claim 2, wherein the using the current model to deblur the intermediate image and the first image having the current scale to obtain the second image further comprises:
obtaining inherent information of images of different scales, the inherent information being transmitted, through a recursive neural network (RNN) in the current model, between an encoding network and a decoding network, each processing different scales; and
using the encoding network and the decoding network to deblur the intermediate image and the first image having the current scale in combination with the inherent information to obtain the second image.

6. The method according to claim 5, wherein the obtaining and transmitting the inherent information of the images of different scales further comprises transmitting the inherent information through a long short-term memory (LSTM) module, and
wherein the LSTM module is located between the encoding network and the decoding network.

7. The method according to claim 1, wherein the combining the plurality of frames of clear images to obtain the plurality of sample images further comprises:
randomly selecting some clear images among the plurality of frames.

8. An image processing device, comprising:
at least one memory configured to store computer program code; and
at least one processor configured to access the memory and operate as instructed by the computer program code, the computer program code comprising:
first obtaining code configured to cause the at least one processor to obtain an image processing instruction, the image processing instruction including an instruction to deblur a target blurred image;
second obtaining code configured to cause the at least one processor to obtain a target model by training an original model based on a plurality of sample images of different scales, one of the plurality of sample images being a blurred image composed of a plurality of clear images, and the obtained target model being used for deblurring the blurred image to obtain a clear image;

response code configured to cause the at least one processor to, based on the image processing instruction, use the target model to deblur the target blurred image to obtain a target clear image;

output code configured to cause the at least one processor to output the target clear image, third obtaining code configured to cause the at least one processor to, before the target model being obtained, obtain a plurality of continuous frames of clear images from a frame image set, the frame image set being a set of all or some of frame images in a video; and combination code configured to cause the at least one processor to combine the plurality of frames of clear images to obtain the plurality of sample images, the plurality of sample images being blurred images, wherein the combination code further comprises:
second processing code configured to cause the at least one processor to successively perform a summation processing and an averaging processing, respectively for each channel processing the some clear images to obtain the blurred image; and
determining code configured to cause the at least one processor to use the blurred image as the one of the plurality of sample images.

9. The image processing device according to claim 8, further comprising:
training code configured to cause the at least one processor to, before the target model being obtained, repeatedly train the original model until a scale of an intermediate image is the same as a scale of one of the plurality of sample images, a current scale of the intermediate image being initialized as a scale of a first image of the plurality of sample images, a current model being initialized as the original model, the intermediate image being initialized as the first image, and the first image being the blurred image obtained by performing down-sampling on a target sample image among the plurality of sample images;
first obtaining code configured to cause the at least one processor to obtain the first image having the current scale, from the plurality of sample images;
first processing code configured to cause the at least one processor to use the current model to deblur the intermediate image and the first image having the current scale to obtain a second image, the second image being a first clear image associated with the first image;
magnification code configured to cause the at least one processor to magnify the second image to obtain a third image, the intermediate image being updated to the third image;
first update code configured to cause the at least one processor to update the current scale to a scale that is N times of the current scale, the N being greater than or equal to 2; and
second update code configured to cause the at least one processor to update the current model to a first model, the first model being obtained by training the original model according to the first image.

10. The image processing device according to claim 9, wherein the current model comprises an encoding network and a decoding network, and the first processing code further comprises:
encoding code configured to cause the at least one processor to use the encoding network to encode the first image and the intermediate image to obtain a first result, two layers of convolutions of the encoding network comprising a residual unit, and the residual unit being configured to add data before the two layers of convolutions are calculated and to add data after the two layers of convolutions are calculated; and
decoding code configured to cause the at least one processor to use the decoding network to decode the first result outputted by the encoding network to obtain the second image, two layers of convolutions of the decoding network comprising the residual unit.

11. The image processing device according to claim 9, wherein the first processing code further comprises:
fourth obtaining code configured to cause the at least one processor to obtain inherent information of images of different scales, the inherent information being transmitted, through a recursive neural network (RNN) in the current model, between an encoding network and a decoding network, each processing different scales; and
third processing code configured to use the encoding network and the decoding network to deblur the intermediate image and the first image having the current scale in combination with the inherent information to obtain the second image.

12. The image processing device according to claim 8, wherein the combination code further comprises:
selection code configured to cause the at least one processor to randomly select some clear images among the plurality of frames.

13. A non-transitory computer-readable storage medium, storing at least one computer program instruction, the at least one computer program instruction, when executed by a processor, causes the processor to:
obtain an image processing instruction including an instruction to deblur a target blurred image;
obtain a target model by training an original model based on a plurality of sample images of different scales, one of the plurality of sample images being a blurred image composed of a plurality of clear images, and the obtained target model being used for deblurring the blurred image to obtain a clear image;
based on the image processing instruction, use the target model to deblur the target blurred image to obtain a target clear image; and
output the target clear image,
wherein before the target model is obtained, the at least one computer program instruction, when executed by the processor causes the processor to:
obtain a plurality of continuous frames of clear images from a frame image set, the frame image set being a set of all or some of frame images in a video;
combine the plurality of frames of clear images to obtain the plurality of sample images, the plurality of sample images being blurred images;
successively perform a summation processing and an averaging processing, respectively, for each channel processing the some clear images to obtain the blurred image; and
use the blurred image as the one of the plurality of sample images.

14. The non-transitory computer-readable storage medium according to claim 13, wherein the at least one computer program instruction is executed by the processor to:
before the target model being obtained, repeatedly train the original model until a scale of an intermediate image is the same as a scale of one of the plurality of sample images, a current scale of the intermediate image being initialized as a scale of a first image of the plurality of sample images, a current model being initialized as the original model, the intermediate image being initialized as the first image, and the first image being the blurred image obtained by performing down-sampling on a target sample image among the plurality of sample images;

obtain the first image having the current scale, from the plurality of sample images;

use the current model to deblur the intermediate image and the first image having the current scale to obtain a second image, the second image being a first clear image associated with the first image;

magnify the second image to obtain a third image, the intermediate image being updated to the third image;

update the current scale to a scale that is N times of the current scale, the N being greater than or equal to 2; and update the current model to a first model, the first model being obtained by training the original model according to the first image.

15. The non-transitory computer-readable storage medium according to claim 14, wherein the current model comprises an encoding network and a decoding network, and wherein the at least one computer program instruction is executed by the processor to:

use the encoding network to encode the first image and the intermediate image to obtain a first result, two layers of convolutions of the encoding network comprising a residual unit, and the residual unit being configured to add data before the two layers of convolutions are calculated and to add data after the two layers of convolutions are calculated; and use the decoding network to decode the first result outputted by the encoding network to obtain the second image, two layers of convolutions of the decoding network comprising the residual unit.

16. The non-transitory computer-readable storage medium according to claim 14, wherein the at least one computer program instruction is executed by the processor to:

obtain inherent information of images of different scales, the inherent information being transmitted, through a recursive neural network (RNN) in the current model, between an encoding network and a decoding network, each processing different scales; and use the encoding network and the decoding network to deblur the intermediate image and the first image having the current scale in combination with the inherent information to obtain the second image.

17. The non-transitory computer-readable storage medium according to claim 13, wherein the at least one computer program instruction is executed by the processor to:

randomly select some clear images among the plurality of frames.

* * * * *